United States Patent [19]

Petrossian-Avakian

[11] 4,388,487

[45] Jun. 14, 1983

[54] ARRANGEMENT FOR PREVENTING THE FORMATION OF A FOREIGN LAYER ON A HIGH-VOLTAGE INSULATOR

[75] Inventor: Edmond Petrossian-Avakian, Erlangen, Fed. Rep. of Germany

[73] Assignee: Siemens Aktiengesellschaft, Munich, Fed. Rep. of Germany

[21] Appl. No.: 333,914

[22] Filed: Dec. 23, 1981

[30] Foreign Application Priority Data

Jan. 27, 1981 [DE] Fed. Rep. of Germany ....... 3102613

[51] Int. Cl.[3] ....................... H01B 17/52; H02G 7/00

[52] U.S. Cl. .................................. 174/40 R; 174/139; 174/211

[58] Field of Search ................... 174/40 R, 45 R, 139, 174/211

[56] References Cited

U.S. PATENT DOCUMENTS

| | | | |
|---|---|---|---|
| 3,445,626 | 5/1969 | Michaels | 219/216 |
| 3,474,223 | 10/1969 | Leiga et al. | 219/216 |
| 3,606,172 | 9/1971 | Sato et al. | 174/139 X |
| 3,871,761 | 3/1975 | Mabrouk | 219/216 |
| 4,034,186 | 7/1977 | Bestenreiner et al. | 219/216 |
| 4,080,158 | 3/1978 | Kondo et al. | 432/59 |
| 4,121,888 | 10/1978 | Tomura et al. | 355/3 FU |
| 4,155,108 | 5/1979 | Tuttle et al. | 174/45 R X |
| 4,160,595 | 7/1979 | Ito et al. | 355/3 FU |

FOREIGN PATENT DOCUMENTS

| | | | |
|---|---|---|---|
| 897276 | 11/1953 | Fed. Rep. of Germany | 174/139 |
| 1093447 | 11/1960 | Fed. Rep. of Germany | 174/139 |
| 2505416 | 8/1976 | Fed. Rep. of Germany | 355/3 FU |
| 54-126546 | 10/1979 | Japan | 355/3 FU |
| 54-126547 | 10/1979 | Japan | 355/3 FU |
| 54-126548 | 10/1979 | Japan | 355/3 FU |

OTHER PUBLICATIONS

Hesselbrock, Fed. Rep. of Germany printed application (Patentanmeldung), R 16,801 VIII d/21c, 7-19-56.

*Primary Examiner*—Laramie E. Askin

*Attorney, Agent, or Firm*—Kenyon & Kenyon

[57] ABSTRACT

An arrangement for preventing the formation of a layer of foreign material on a high-voltage insulator. In situations where wind and rain are not available to clean a high-voltage insulator and thereby prevent arcing, this invention provides blowers which move a stream of air around the insulator. The blowers may be provided with motors which are supplied electrical energy from local low-voltage networks, or from a plurality of solar cells which are disposed on grounded parts of the support structure of the power line network. In some embodiments, the blowers may be of a motorless type and mounted directly on a high-voltage carrying conductor. In such a motorless blower arrangement, the blower blade is configured so as to have points which generate and repel ions in accordance with the known point-effect principle.

4 Claims, 7 Drawing Figures

ARRANGEMENT FOR PREVENTING THE FORMATION OF A FOREIGN LAYER ON A HIGH-VOLTAGE INSULATOR

BACKGROUND OF THE INVENTION

This invention relates generally to high-voltage insulators, and more particularly, to an arrangement for preventing the formation of a foreign layer on a high-voltage insulator by means of an air blast.

High-voltage insulators are known as being prone to arcing, particularly in areas where foreign substances which are contained in air are deposited on the insulators so as to form conducting foreign layers which are moistened by dew or fog. Wind and rain are a cleansing means by which the foreign substance layers can be removed naturally from the insulators. However, in situations where wind and rain are not available to perform the cleaning operation, the ability of the insulators to perform the insulating function is greatly limited. Consequently, the insulators will fail thereby producing disturbances in the distribution of power.

One known device for cleaning overhead power line insulators utilizes pressurized water. The known device consists of a pressurized water standpipe which is raised at the high-voltage tower and rotatably connected at a suitable height to a jet pipe which is movable in a vertical plane. The direction of the water jet can be controlled from the ground by swiveling and turning the standpipe. It is, however, difficult to divide the water jet into individual droplets to reduce the conduction of electric current through the water stream. Moreover, a substantial amount of equipment is required to bring the water to the desired location.

One known system which is particularly adapted for removing dust from horizontal feedthroughs of insulating material in high-voltage switching installation utilizes in its upper portion a plurality of nozzles for intermittently blasting the feedthrough with compressed air. The compressed air is obtained from the compressed air system which serves for operating the breakers. In this arrangement, the nozzles and the feed line are well grounded. However, although this system can be economically used in switching plants, such is not the case with high-voltage overhead lines.

It is, therefore, an object of this invention to provide an arrangement which can be used in open-air switching installations as well as in high-voltage overhead lines to prevent the formation of foreign layers on the high-voltage insulators.

SUMMARY OF THE INVENTION

The foregoing and other objects are achieved by this invention which provides at least one blower in the vicinity of the high-voltage insulator, the blower being arranged so that the insulating surface of the high-voltage insulator is covered by an air stream.

The inventive arrangement prevents the deposition of foreign particles on the insulator and the removal of dropped-on particles is facilitated. Moreover, the formation of dew is prevented on the high-voltage insulators because the blowers may be operated continuously with very little power. More particularly, the morning dew which forms at sunrise can be dried quickly, and thereby prevent dreaded morning dew sparkovers.

In switching plants, the blowers can be operated by feeding them with low voltage from the internal network. In overhead line systems, and in switching plants, solar cells may serve for feeding the blowers.

BRIEF DESCRIPTION OF THE DRAWINGS

Comprehension of the invention is facilitated by reading the following detailed description in conjunction with the annexed drawings, in which.

DETAILED DESCRIPTION

Figure 1:
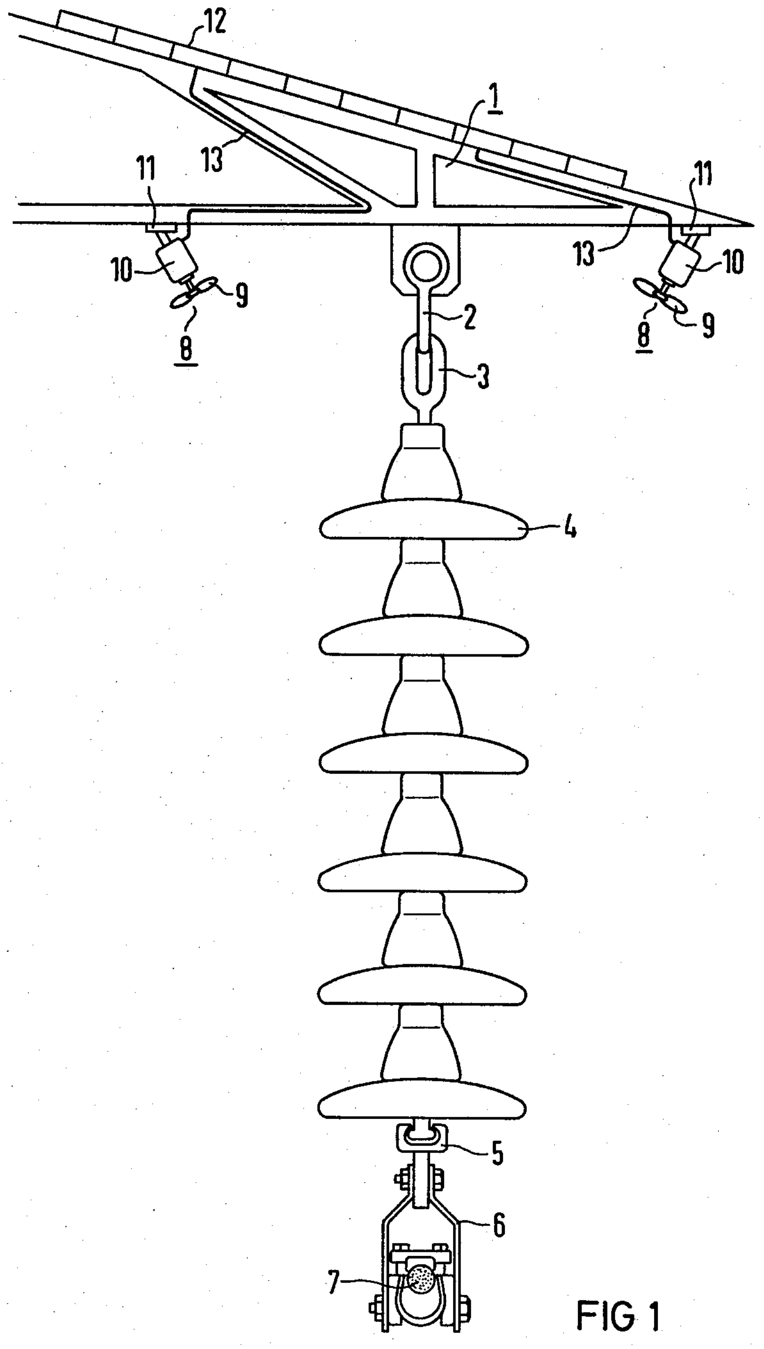
FIG. 1 is a representation of an overhead line insulator having two blowers associated therewith, in accordance with the principles of the invention.

FIG. 1 shows a cross arm 1 of a high-voltage overhead line mast, a single suspension chain consisting of a shackle 2, an eye 3, a cap-type insulator 4 having a cup socket 5, and a support clamp 6 for an overhead line cable 7. A plurality of blowers 8 are arranged on the underside of cross arm 1 in the immediate vicinity of the insulator chain. The blowers are arranged so that the entire insulating surface of the high-voltage insulator is covered by the air stream. Blowers 8 are each provided with a blower blade 9 which is connected via a shaft to an electric motor 10. Each blower is further provided with a fastening clamp 11 which is designed to permit adjustment of the air stream in the desired direction. In this embodiment, a plurality of solar cells 12 are arranged at a suitable location on the mast or the mast arm, and are electrically connected to motors 10 by electric lines 13.

Figure 2:
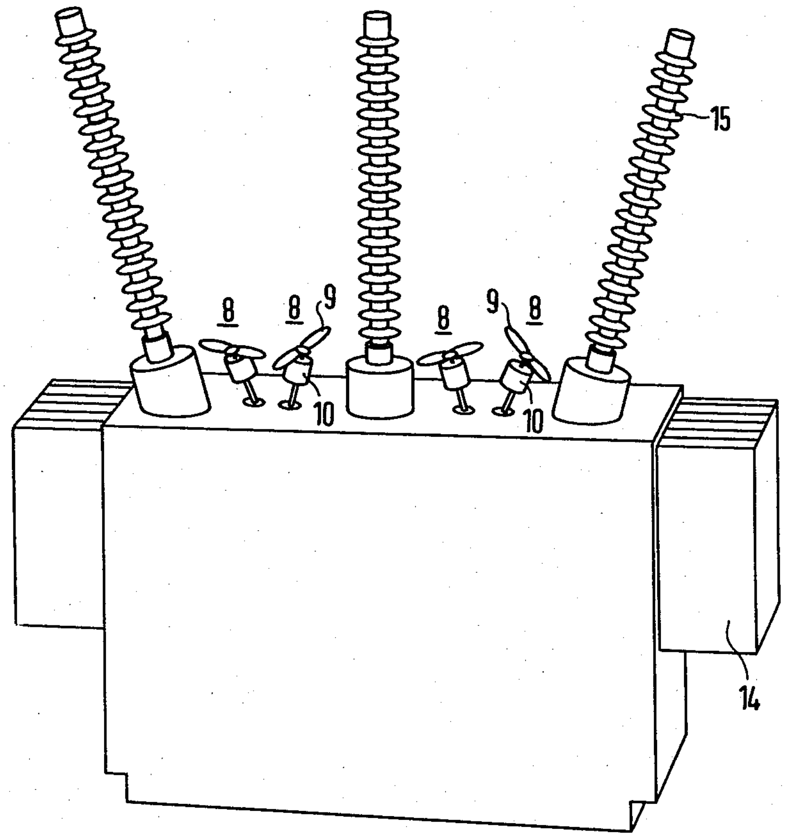
FIG. 2 shows a transformer having several feedthrough insulators, and associated blowers.

FIG. 2 shows a transformer 14 having feedthrough insulators 15. A plurality of blowers 8 are arranged on the housing of transformer 14, the blowers being oriented to blow air upon feedthrough insulators 15. Blades 9 of the blowers are driven by motors 10 which are supplied low-voltage electricity from an existing network.

Figure 3:
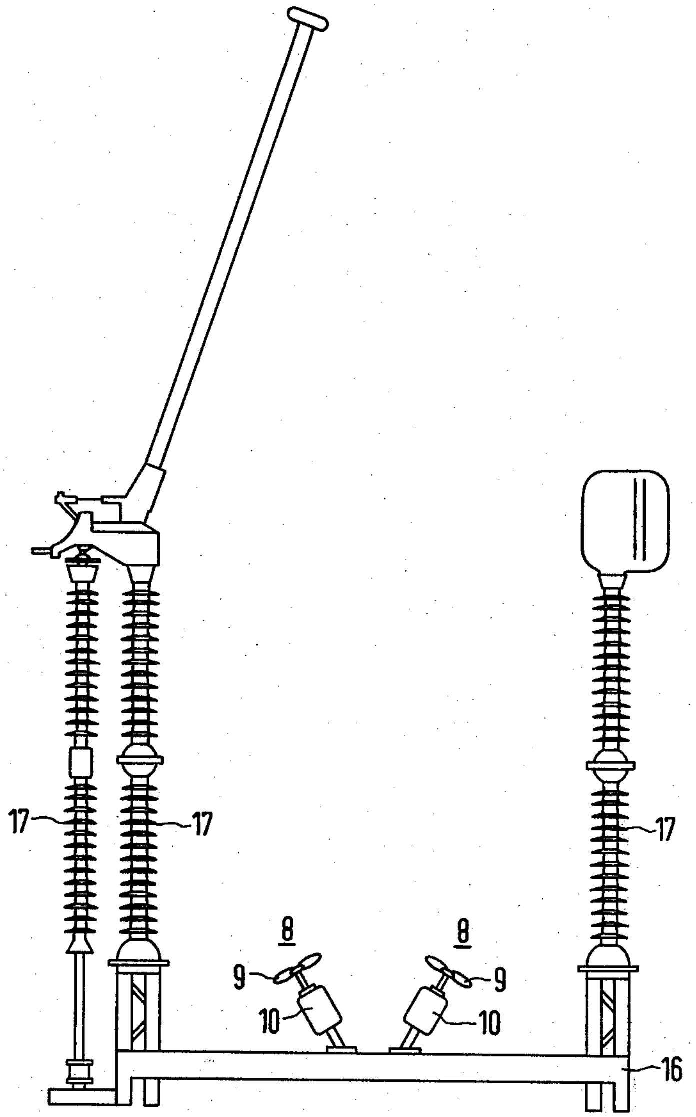
FIG. 3 shows a high-voltage disconnect switch and two blowers associated with the pin insulators.

FIG. 3 shows an open-air breaker having two blowers 8; the air stream of the blowers being directed at pin insulators 17 which are attached to a support 16 of the support structure.

Figure 4:
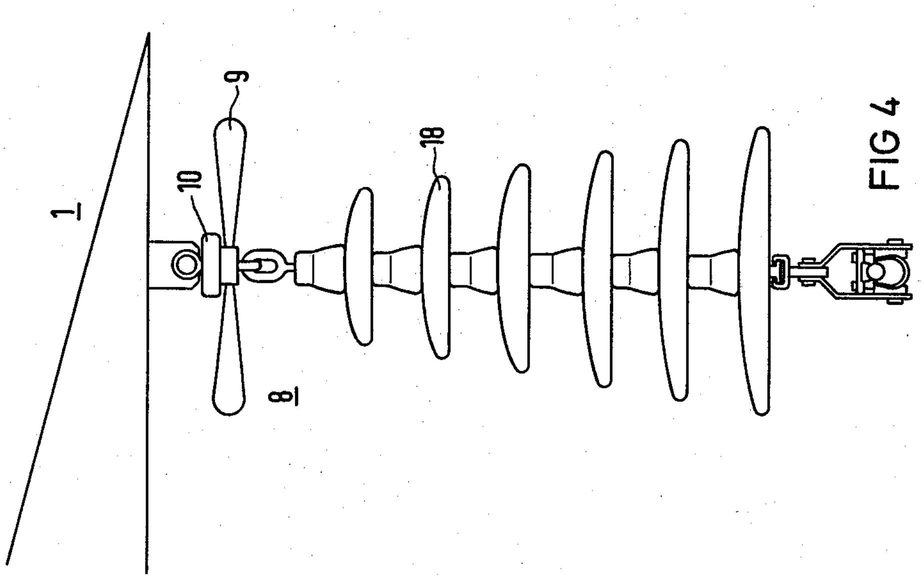
FIG. 4 shows a cap insulator arranged at an overhead line tower, the insulator having a central blower.

FIG. 4 shows a particularly advantageously embodiment of the invention wherein an insulator is assembled from a plurality of cap insulators 18. Cap insulators 18 are of different diameters and are progressively arranged so that higher ones of the cap insulators have smaller diameters. Such an arrangement permits a single blower 8 to be advantageously arranged coaxially with the insulator chain.

Figure 5:
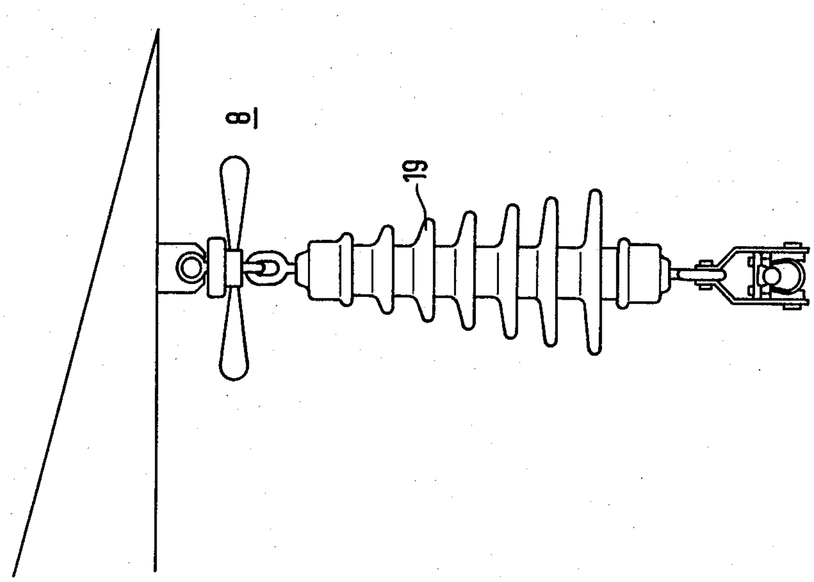
FIG. 5 shows a long-rod insulator arranged at a high-voltage tower, the insulator having a central blower.

FIG. 5 shows an embodiment of the invention which is similar to that of FIG. 4. However, the embodiment of FIG. 5 is provided with a long-rod insulator 19.

Figure 6:
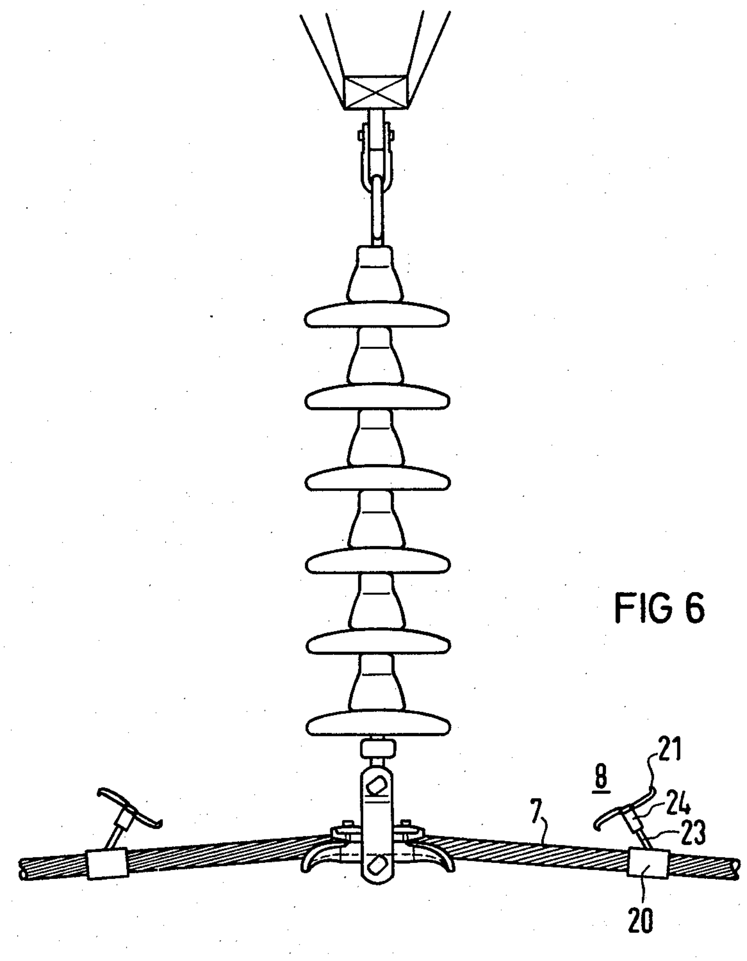
FIG. 6 shows a cap-type insulator arranged at a high-voltage tower, the insulator having two associated blowers fastened to the conductor cables.

FIG. 6 shows an embodiment of the invention which is particularly useful in high-voltage installations wherein the blowers cannot be supplied by a low-voltage network, or solar batteries. In this embodiment, the blowers are fastened to a cable 7 which carries the high-voltage. Such fastening is achieved by means of respective clamps 20. In addition, each blower is provided with an ajustable holder 23 which carries at its end a blower blade 21 which is supported by a ball bearing 24. Adjustable holder 23 is connected at an end thereof which is distal ball bearings 24 to cable clamps 20. In this embodiment, blowers 8 are designed without a motor.

Figure 7:
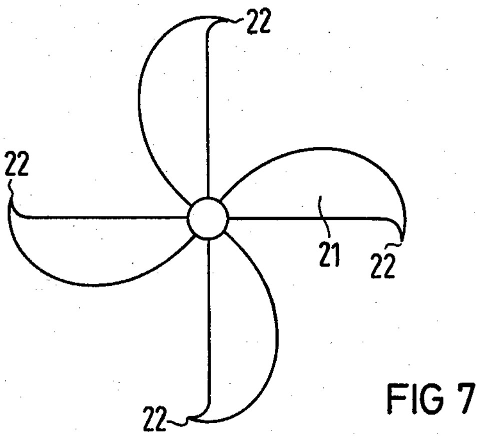
FIG. 7 is a top view of a blower blade for the blowers shown in FIG. 6.

FIG. 7 is a plan view of blower blade 21 which is used in the embodiment of FIG. 6. The blower blade is driven by the formation of ions at tangentially bent metal tips 22 and the repulsion of the ions according to the known point-effect principle (electron emission).

Although the invention has been described in terms of specific embodiments and applications, it is to be understood that, in light of this teaching, persons skilled in the art can generate additional embodiments, without exceeding the scope of the claimed invention. Accordingly, it is to be understood that the drawings and descriptions in this disclosure are proffered merely to facilitate comprehension of the invention and should not be construed to limit the scope thereof.

What is claimed is:

1. An arrangement for preventing the formation of a foreign layer on a high-voltage insulator which is at least partially exposed, the arrangement comprising fan means having an exposed fan blade disposed in the vicinity of the high-voltage insulator, said fan means being arranged to cover the exposed portion of the high-voltage insulator with an air stream.

2. The arrangement of claim 1 wherein there are further provided solar cell means for supplying electrical energy to said fan means, said solar cell means being attached to a grounded portion of an electrical network.

3. The arrangement of claim 1 wherein the high-voltage insulator is an overhead line insulator, said overhead line insulator having a plurality of shields having different diameters from one another, said shields being arranged so that their respective diameters are progressively decreasing in the direction of said fan means.

4. The arrangement of claim 1 wherein said fan means is of a motorless type, and is attached to high-voltage carrying parts of a network, said fan blade having electrically conducting points, said electrically conducting points driving said fan blade to rotation by generating and repelling ions, in accordance with a point-effect principle.

* * * * *